US012260801B2

(12) United States Patent
Choi

(10) Patent No.: US 12,260,801 B2
(45) Date of Patent: Mar. 25, 2025

(54) DISPLAY DEVICE AND DRIVING METHOD THEREOF

(71) Applicant: Samsung Display Co., LTD., Yongin-si (KR)

(72) Inventor: Yong Seok Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/237,984

(22) Filed: Aug. 25, 2023

(65) Prior Publication Data

US 2024/0135855 A1 Apr. 25, 2024
US 2024/0233603 A9 Jul. 11, 2024

(30) Foreign Application Priority Data

Oct. 25, 2022 (KR) ........................ 10-2022-0138638

(51) Int. Cl.
*G09G 3/20* (2006.01)
*G09G 3/32* (2016.01)

(52) U.S. Cl.
CPC ......... *G09G 3/2022* (2013.01); *G09G 3/2074* (2013.01); *G09G 3/32* (2013.01); *G09G 2300/0452* (2013.01); *G09G 2300/0819* (2013.01); *G09G 2300/0842* (2013.01); *G09G 2310/08* (2013.01); *G09G 2320/02* (2013.01)

(58) Field of Classification Search
CPC .. G09G 3/2022; G09G 3/2074; G09G 3/3413; G09G 3/3233; G09G 3/32; G09G 2300/0452; G09G 2310/08; G09G 2320/0233; G09G 2320/02
See application file for complete search history.

(56) References Cited

U.S. PATENT DOCUMENTS 7,391,486 B2 * 6/2008 Hong .................. G09G 3/3413 348/E5.073
10,510,325 B2 12/2019 Jin et al.
2016/0300538 A1 * 10/2016 Lee ...................... G09G 3/3607
2023/0178013 A1 * 6/2023 Oh ....................... G09G 3/3233 345/690

FOREIGN PATENT DOCUMENTS

KR 102275712 B1 7/2021

* cited by examiner

*Primary Examiner* — Xuemei Zheng
(74) *Attorney, Agent, or Firm* — CANTOR COLBURN LLP

(57) ABSTRACT

A display device includes a processor providing an image frame, a sub-frame generator generating a first sub-frame and a second sub-frame based on the image frame, and a pixel part for sequentially displaying a first image corresponding to the first sub-frame and a second image corresponding to the second sub-frame, wherein the image frame includes a first color grayscale, a second color grayscale, and a third color grayscale for each pixel, the first sub-frame includes the first color grayscale and the second color grayscale for a first pixel, and does not include the third color grayscale, and the second sub-frame includes the second color grayscale and the third color grayscale for the first pixel, and does not include the first color grayscale.

18 Claims, 11 Drawing Sheets

DISPLAY DEVICE AND DRIVING METHOD THEREOF

This application claims priority to Korean Patent Application No. 10-2022-0138638, filed on Oct. 25, 2022, and all the benefits accruing therefrom under 35 U.S.C. § 119, the content of which in its entirety is herein incorporated by reference.

BACKGROUND

(a) Field

Embodiments of the disclosure relate to a display device and a driving method thereof.

(b) Description of the Related Art

As information technology is being developed, an importance of a display device, which is a connection medium between a user and information, is being highlighted. Accordingly, a use of display devices such as a liquid crystal display device, an organic light-emitting display device, and the like is increasing.

SUMMARY

The display device displays an image through a plurality of pixels, and the plurality of pixels may be disposed in various structures to meet specifications of the display device. In some cases, the number of color grayscales of an inputted image frame may not be the same as the number of physical sub-pixels of the display device. In this case, color grayscales between adjacent pixels of an image frame may be rendered and then provided to sub-pixels, and image quality deterioration may occur.

Embodiments of the disclosure have been made in an effort to provide a display device and a driving method thereof in which image quality deterioration may be prevented even when the number of sub-pixels is smaller than the number of color grayscales of an inputted image frame.

An embodiment of the invention provides a display device including a processor which provides an image frame, a sub-frame generator which generates a first sub-frame and a second sub-frame based on the image frame, and a pixel part which sequentially displays a first image corresponding to the first sub-frame and a second image corresponding to the second sub-frame, wherein the image frame includes a first color grayscale, a second color grayscale, and a third color grayscale for each pixel, the first sub-frame includes the first color grayscale and the second color grayscale for a first pixel, and does not include the third color grayscale, and the second sub-frame includes the second color grayscale and the third color grayscale for the first pixel, and does not include the first color grayscale.

In an embodiment, the first color grayscale for the first pixel in the first sub-frame may be identical to the first color grayscale for the first pixel in the image frame.

In an embodiment, the second color grayscale for the first pixel in the first sub-frame may be smaller than the second color grayscale for the first pixel in the image frame.

In an embodiment, the third color grayscale for the first pixel in the second sub-frame may be identical to the third color grayscale for the first pixel in the image frame.

In an embodiment, the second color grayscale for the first pixel in the second sub-frame may be smaller than the second color grayscale for the first pixel in the image frame.

In an embodiment, the second color grayscale for the first pixel in the second sub-frame may be identical to the second color grayscale for the first pixel in the first sub-frame.

In an embodiment, the first sub-frame may include the second color grayscale and the third color grayscale for a second pixel closest to the first pixel in a first direction, and may not include the first color grayscale, and the second sub-frame may include the first color grayscale and the second color grayscale for the second pixel, and may not include the third color grayscale.

In an embodiment, the pixel part may include a first sub-pixel of a first color, a second sub-pixel of a third color, and a third sub-pixel of the first color that are sequentially arranged in the first direction, the pixel part may further include a fourth sub-pixel of a second color closest to the first sub-pixel and the second sub-pixel in a second direction therebetween, and the pixel part may further include a fifth sub-pixel of the second color closest to the second sub-pixel and the third sub-pixel in the second direction therebetween.

In an embodiment, in the first sub-frame, the first sub-pixel may display the first color grayscale of the first pixel, the fourth sub-pixel may display the second color grayscale of the first pixel, the second sub-pixel may display the third color grayscale of the second pixel, and the fifth sub-pixel may display the second color grayscale of the second pixel.

In an embodiment, in the second sub-frame, the second sub-pixel may display the third color grayscale of the first pixel, the fourth sub-pixel may display the second color grayscale of the first pixel, the third sub-pixel may display the first color grayscale of the second pixel, and the fifth sub-pixel may display the second color grayscale of the second pixel.

In an embodiment, the sub-frame generator may further generate a third sub-frame and a fourth sub-frame based on the image frame, the pixel part may sequentially further display a third image corresponding to the third sub-frame and a fourth image corresponding to the fourth sub-frame after the second image, the third sub-frame may include the second color grayscale and the third color grayscale for a third pixel, but may not include the first color grayscale, and the fourth sub-frame may include the first color grayscale and the second color grayscale for the third pixel, and may not include the third color grayscale.

In an embodiment, the third sub-frame may include the first color grayscale and the second color grayscale for a fourth pixel closest to the third pixel in the first direction, and may not include the third color grayscale, and the fourth sub-frame may include the second color grayscale and the third color grayscale for the fourth pixel, and may not the first color grayscale.

In an embodiment, the pixel part may further include a sixth sub-pixel of the third color, a seventh sub-pixel of the first color, and an eighth sub-pixel of the third color sequentially arranged in the first direction, the sixth sub-pixel may be disposed in the second direction from the first sub-pixel, the seventh sub-pixel may be disposed in the second direction from the second sub-pixel, and the eighth sub-pixel may be disposed in the second direction from the third sub-pixel.

In an embodiment, in the third sub-frame, the fourth sub-pixel may display the second color grayscale of the third pixel, the sixth sub-pixel may display the third color grayscale of the third pixel, the fifth sub-pixel may display the second color grayscale of the fourth pixel, and the seventh sub-pixel may display the first color grayscale of the fourth pixel.

In an embodiment, in the fourth sub-frame, the fourth sub-pixel may display the second color grayscale of the third pixel, the seventh sub-pixel may display the first color grayscale of the third pixel, the fifth sub-pixel may display the second color grayscale of the fourth pixel, and the eighth sub-pixel may display the third color grayscale of the fourth pixel.

Another embodiment of the invention provides a driving method of a display device, including receiving an image frame, generating a first sub-frame based on the image frame, displaying, by a pixel part, a first image corresponding to the first sub-frame, generating a second sub-frame based on the image frame, and displaying, by the pixel part, a second image corresponding to the second sub-frame, wherein the image frame may include a first color grayscale, a second color grayscale, and a third color grayscale for each pixel, the first sub-frame may include the first color grayscale and the second color grayscale for a first pixel, and may not include the third color grayscale, and the second sub-frame may include the second color grayscale and the third color grayscale for the first pixel, and may not include the first color grayscale.

In an embodiment, the first color grayscale for the first pixel in the first sub-frame may be identical to the first color grayscale for the first pixel in the image frame.

In an embodiment, the second color grayscale for the first pixel in the first sub-frame may be smaller than the second color grayscale for the first pixel in the image frame.

In an embodiment, the third color grayscale for the first pixel in the second sub-frame may be identical to the third color grayscale for the first pixel in the image frame.

In an embodiment, the second color grayscale for the first pixel in the second sub-frame may be smaller than the second color grayscale for the first pixel in the image frame.

The display device and the driving method thereof according to the invention may prevent image quality deterioration even when the number of sub-pixels is smaller than the number of color grayscales of an inputted image frame.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
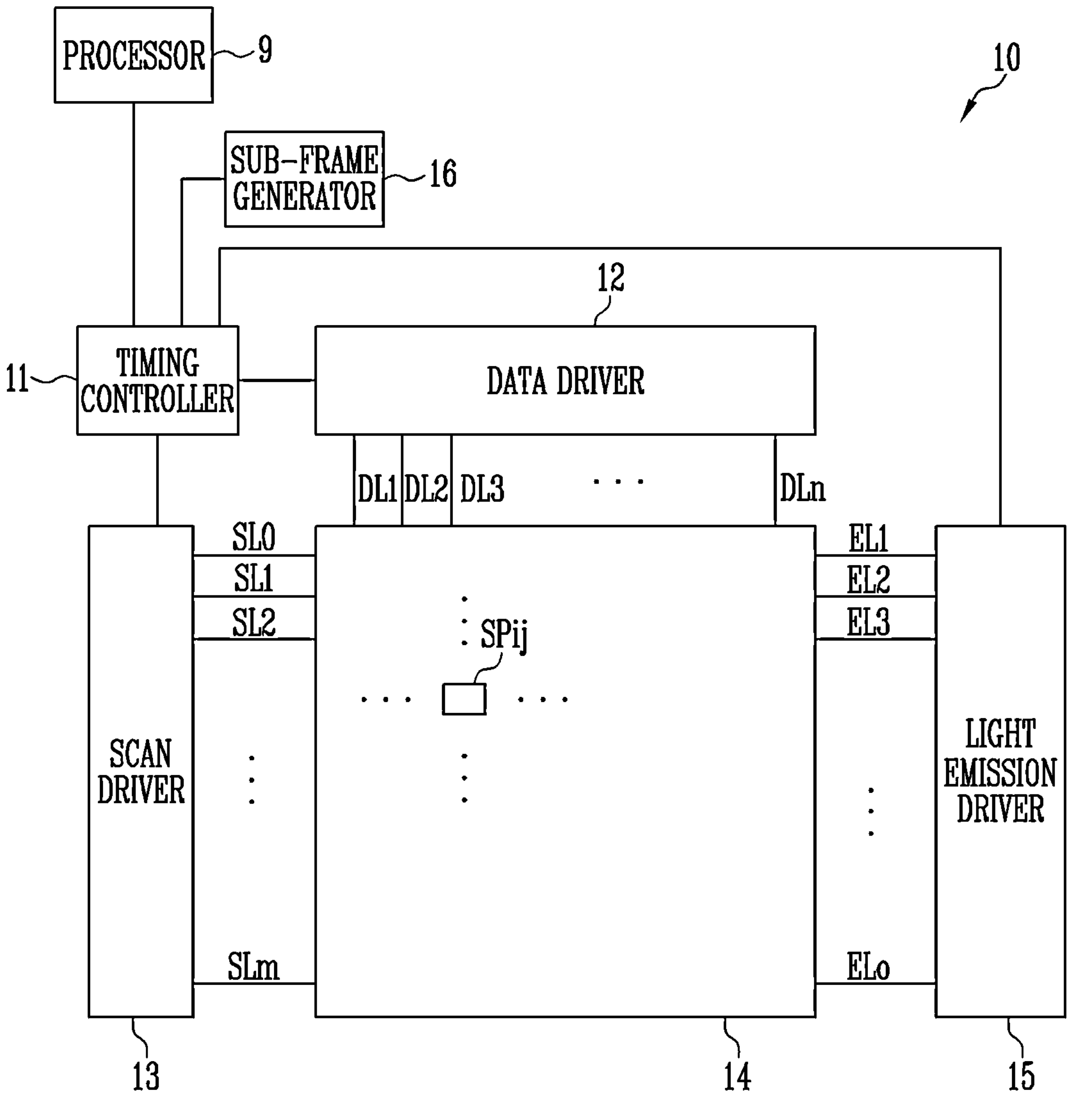
FIG. 1 illustrates a drawing for explaining an embodiment of a display device according to the invention.

Embodiments of the disclosure will be described more fully hereinafter with reference to the accompanying drawings, in which embodiments of the invention are shown. As those skilled in the art would realize, the described embodiments may be modified in various different ways, all without departing from the spirit or scope of the invention.

In order to clearly describe the invention, parts or portions that are irrelevant to the description are omitted, and identical or similar constituent elements throughout the specification are denoted by the same reference numerals. Therefore, the above-mentioned reference numerals may be used in other drawings.

Further, in the drawings, the size and thickness of each element are arbitrarily illustrated for ease of description, and the disclosure is not necessarily limited to those illustrated in the drawings. In the drawings, the thicknesses of layers, films, panels, regions, areas, etc. may be exaggerated for clarity.

In addition, the expression "equal to or the same as" in the description may mean "substantially equal to or the same as". That is, it may be the same enough to convince those skilled in the art to be the same. Even other expressions may be expressions from which "substantially" is omitted.

The term "part" or "unit" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

FIG. 1 illustrates a drawing for explaining an embodiment of a display device according to the invention.

Referring to FIG. 1, a display device 10 in an embodiment of the disclosure may include a processor 9, a timing controller 11, a data driver 12, a scan driver 13, a pixel part 14, a light emission driver 15, and a sub-frame generator 16.

The processor 9 may provide an image frame. The image frame may include a first color grayscale, a second color grayscale, and a third color grayscale for each pixel. The first color grayscale may be a grayscale for displaying a first color, the second color grayscale may be a grayscale for displaying a second color, and the third color grayscale may be a grayscale for displaying a third color. The processor 9 may be an application processor, a central processing unit ("CPU"), or a graphics processing unit ("GPU").

In addition, the processor 9 may provide a control signal for the image frame. The control signal may include a horizontal synchronization signal ("Hsync"), a vertical synchronization signal ("Vsync"), and a data enable signal. The vertical synchronization signal may include a plurality of pulses, and may indicate that a previous frame period ends and a current frame period begins based on a time point at which each pulse is generated. An interval between adjacent pulses of the vertical synchronization signal may correspond to one frame period. The horizontal synchronization signal may include a plurality of pulses, and may indicate that a previous horizontal period ends and a new horizontal period begins based on a time point at which each pulse is generated. An interval between adjacent pulses of the horizontal synchronization signal may correspond to one horizontal period. The data enable signal may have an enable level for predetermined horizontal periods, and may have a disable level for the remaining periods. When the data enable signal is at the enable level, it may indicate that the color grayscales are supplied in corresponding horizontal periods.

The timing controller 11 may receive color grayscales and control signals for an image frame from the processor 9. The sub-frame generator 16 may generate a first sub-frame and a second sub-frame based on the image frame. In some embodiments, the sub-frame generator 16 may generate two or more sub-frames based on an image frame. In an embodiment, the sub-frame generator 16 may generate a first sub-frame, a second sub-frame, a third sub-frame, and a fourth sub-frame based on an image frame, for example.

The timing controller 11 may provide color grayscales and control signals of the sub-frames to the data driver 12. In an embodiment, when sub-frame generator 16 generates two sub-frames (the first sub-frame and the second sub-frame) based on an image frame, the timing controller 11 may first provide the color grayscales of the first sub-frame to the data driver 12, and then may provide the color grayscales of the second sub-frame to the data driver 12, for example. In this case, the color grayscales of the first sub-frame may be provided for about a ½ frame period. In addition, the color grayscales of the second sub-frame may be provided for about a ½ frame period. When the sub-frame generator 16 generates four sub-frames (the first, second, third, and fourth sub-frames) based on the image frame, the timing controller 11 may provide the color grayscales of the first sub-frame for a ¼ frame period, then may provide the color grayscales of the second sub-frame for a ¼ frame period, then may provide the color grayscales of the third sub-frame for a ¼ frame period, and then may provide the color grayscales of the fourth sub-frame for a ¼ frame period.

In addition, the timing controller 11 may provide a clock signal, a scan start signal, or the like to the scan driver 13. The timing controller 11 may provide a clock signal, a light emission stop signal, or the like to the light emission driver 15.

The data driver 12 may generate data voltages to be provided to data lines (DL1, DL2, DL3, . . . , and DLn) by the color grayscales and the control signals received from the timing controller 11. In an embodiment, the data driver 12 may sample color grayscales by a clock signal, and may apply data voltages corresponding to the color grayscales to the data lines DL1 to DLn in units of pixel rows, for example. Here, n may be an integer larger than zero. The pixel row means sub-pixels connected to the same scan lines and light emission line.

The scan driver 13 may receive a clock signal, a scan start signal, or the like from the timing controller 11 to generate scan signals to be provided to scan lines (SL0, SL1, SL2, . . . , and SLm). In an embodiment, the scan driver 13 may sequentially provide scan signals having a turn-on level pulse to the scan lines SL1 to SLm, for example. In an embodiment, the scan driver 13 may be configured in the form of a shift register, and may generate the scan signals in a manner that sequentially transmits the scan start signal in the form of a pulse of a turn-on level to a next stage circuit according to control of the clock signal, for example. Here, m may be an integer larger than zero.

The light emission driver 15 may receive a clock signal, a light emission stop signal, or the like from the timing controller 11 to generate light-emitting signals to provide to light emission lines (EL1, EL2, EL3, . . . , and ELo). In an embodiment, the light emission driver may sequentially provide light-emitting signals having a pulse of a turn-off level to the light emission lines EL1 to ELo, for example. In an embodiment, the light emission driver 15 may be configured in the form of a shift register, and may generate the light-emitting signals in a manner that sequentially transmits the light-emitting stop signal in the form of a pulse of a turn-off level to a next stage circuit according to control of the clock signal, for example. Here, o may be an integer larger than zero.

The pixel part 14 includes sub-pixels. Each sub-pixel SPij may be connected to a corresponding data line, scan line, and light emission line. Here, i and j may each be an integer larger than 0. The sub-pixel SPij may mean a sub-pixel in which a scan transistor is connected to an i-th scan line and a j-th data line. The pixel part 14 may sequentially display a first image corresponding to the first sub-frame and a second image corresponding to the second sub-frame. In an embodiment, when the sub-frame generator 16 further generates the third and fourth sub-frames based on the image frame, the pixel part 14 may further sequentially display a third image corresponding to the third sub-frame and a fourth image corresponding to the fourth sub-frame after the second image, for example.

The pixel part 14 may include sub-pixels emitting light of the first color, sub-pixels emitting light of the second color, and sub-pixels emitting light of the third color. The first color, the second color, and the third color may be different colors. In an embodiment, the first color may be one color of red, green, and blue, the second color may be one color of red, green, and blue excluding the first color, and the third color may be the remaining color of red, green, blue excluding the first and second colors, for example. In addition, magenta, cyan, and yellow may be used instead of red, green, and blue as the first to third colors. However, in the illustrated embodiment, it is assumed that the first color is red, the second color is green, and the third color is blue for better understanding and ease of description.

The pixel part 14 may be disposed in various shapes such as diamond PENTILE™, RGB-stripe, S-stripe, real RGB, and normal PENTILE™.

Hereinafter, the position of the sub-pixel SPij will be described based on the position of each light-emitting element (e.g., a light-emitting diode). The position of the pixel circuit connected to each light-emitting element may not correspond to the position of the light-emitting element, and may be appropriately disposed in the display device 10 for space efficiency.

In the above-described embodiment, the sub-frame generator 16 is illustrated as a separate component from the timing controller 11. However, in some embodiments, a portion or all of the sub-frame generator 16 may be integrally configured with the timing controller 11. In an embodiment, a portion or all of the sub-frame generator 16 may be configured in the form of an integrated circuit ("IC") together with the timing controller 11, for example. In some embodiments, a portion or all of the sub-frame generator 16 may be implemented as software in the timing controller 11. In another embodiment, a portion or all of the sub-frame generator 16 may be configured in the form of an IC together with the data driver 12. In some embodiments, a portion or all of the sub-frame generator 16 may be implemented as software in the sub-frame generator 16. In another embodiment, a portion or all of the sub-frame generator 16 may be configured in the form of an IC together with the processor 9. In some embodiments, a portion or all of the sub-frame generator 16 may be implemented as software in the processor 9.

Figure 2:
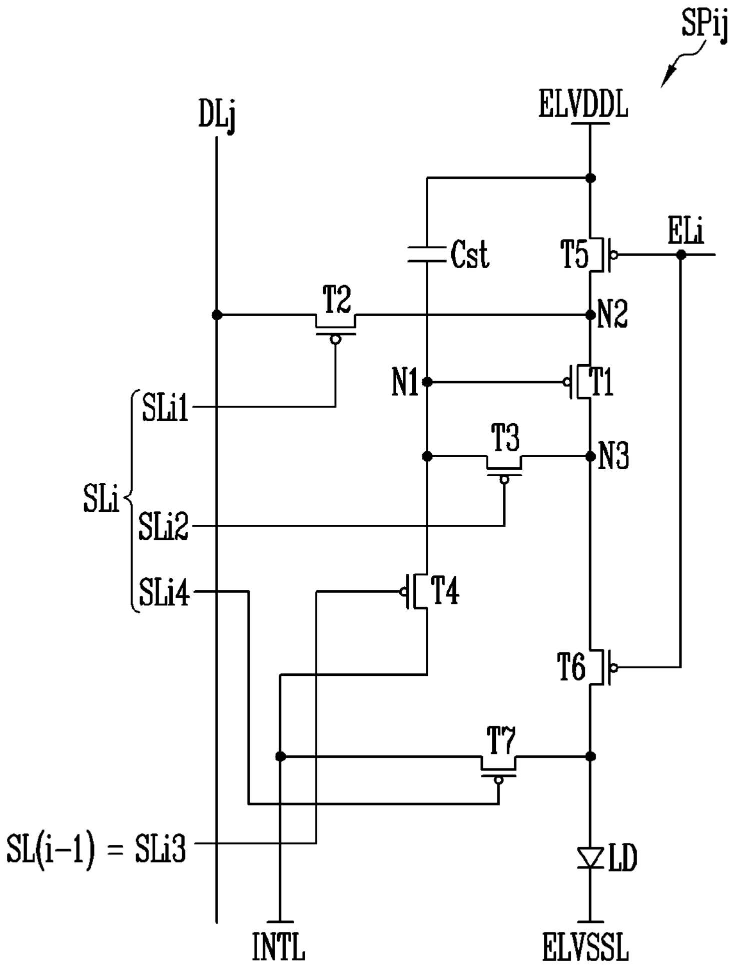
FIG. 2 illustrates a drawing for explaining an embodiment of a sub-pixel according to the invention.

FIG. 2 illustrates a drawing for explaining an embodiment of a sub-pixel according to the invention.

Referring to FIG. 2, the sub-pixel SPij includes transistors T1, T2, T3, T4, T5, T6, and T7, a storage capacitor Cst, and a light-emitting element LD.

Hereinafter, a circuit configured of a P-type transistor will be described as an example. However, a person of an ordinary skill in the art, by changing a polarity of a voltage applied to a gate terminal, may design a circuit configured of an N-type transistor. Similarly, a person of an ordinary skill in the art would be able to design a circuit configured of a combination of a P-type of transistor and an N-type of transistor. The P-type of transistor refers to a transistor in which an amount of current increases when a voltage difference between a gate electrode and a source electrode increases in a negative direction. The N-type of transistor refers to a transistor in which an amount of current increases when a voltage difference between a gate electrode and a source electrode increases in a positive direction. The transistor may have various kinds such as a thin film transistor ("TFT"), a field effect transistor ("FET"), and a bipolar junction transistor ("BJT").

In the first transistor T1, a gate electrode may be connected to a first node N1, a first electrode may be connected to a second node N2, and a second electrode may be connected to a third node N3. The first transistor T1 may be also referred to as a driving transistor.

In the second transistor T2, a gate electrode may be connected to a scan line SLi1, a first electrode may be connected to a data line DLL and a second electrode may be connected to the second node N2. The second transistor T2 may be also referred to as a scan transistor.

In the third transistor T3, a gate electrode may be connected to a scan line SLi2, a first electrode may be connected to the first node N1, and a second electrode may be connected to the third node N3. The third transistor T3 may be also referred to as a diode-connection transistor.

In the fourth transistor T4, a gate electrode may be connected to a scan line SLi3, a first electrode may be connected to the first node N1, and a second electrode may be connected to an initialization line INTL. The fourth transistor T4 may be also referred to as a gate initialization transistor.

In the fifth transistor T5, a gate electrode may be connected to an i-th light emission line ELi, a first electrode may be connected to a first power line ELVDDL, and a second electrode may be connected to the second node N2. The fifth transistor T5 may be also referred to as a light emission transistor. In another embodiment, the gate electrode of the fifth transistor T5 may be connected to a light emission line different from a light emission line connected to a gate electrode of the sixth transistor T6.

In the sixth transistor T6, the gate electrode may be connected to the i-th light emission line ELi, a first electrode may be connected to the third node N3, and a second electrode may be connected to an anode of the light-emitting element LD. The sixth transistor T6 may be also referred to as a light emission transistor. In another embodiment, the gate electrode of the sixth transistor T6 may be connected to a light emission line different from a light emission line connected to the gate electrode of the fifth transistor T5.

In the seventh transistor T7, a gate electrode may be connected to a scan line SLi4, a first electrode may be connected to the initialization line INTL, and a second electrode may be connected to the anode of the light-emitting element LD. The seventh transistor T7 may be also referred to as a light-emitting element initialization transistor.

A first electrode of the storage capacitor Cst may be connected to the first power line ELVDDL, and a second electrode thereof may be connected to the first node N1.

The anode of the light-emitting element LD may be connected to the second electrode of the sixth transistor T6, and a cathode thereof may be connected to a second power line ELVSSL. The light-emitting element LD may be a light-emitting diode. The light-emitting element LD may include an organic light-emitting diode, an inorganic light-emitting diode, and a quantum dot/well light-emitting diode. In the illustrated embodiment, only one light-emitting element LD is provided in each pixel, but in another embodiment, a plurality of light-emitting elements may be provided in each pixel. In this case, the plurality of light-emitting elements may be connected in series, in parallel, or in series/parallel. The light-emitting element LD of each sub-pixel SPij may emit light of one of the first color, second color, and third color.

A first power voltage may be applied to the first power line ELVDDL, a second power voltage may be applied to the second power line ELVSSL, and an initialization voltage may be applied to the initialization line INTL. In an embodiment, the first power voltage may be larger than the second power voltage, for example. In an embodiment, the initialization voltage may be equal to or larger than the second power voltage, for example. In an embodiment, the initialization voltage may correspond to a smallest one of data voltages that may be provided. In another embodiment, the initialization voltage may be smaller than the data voltages that may be provided.

Figure 3:
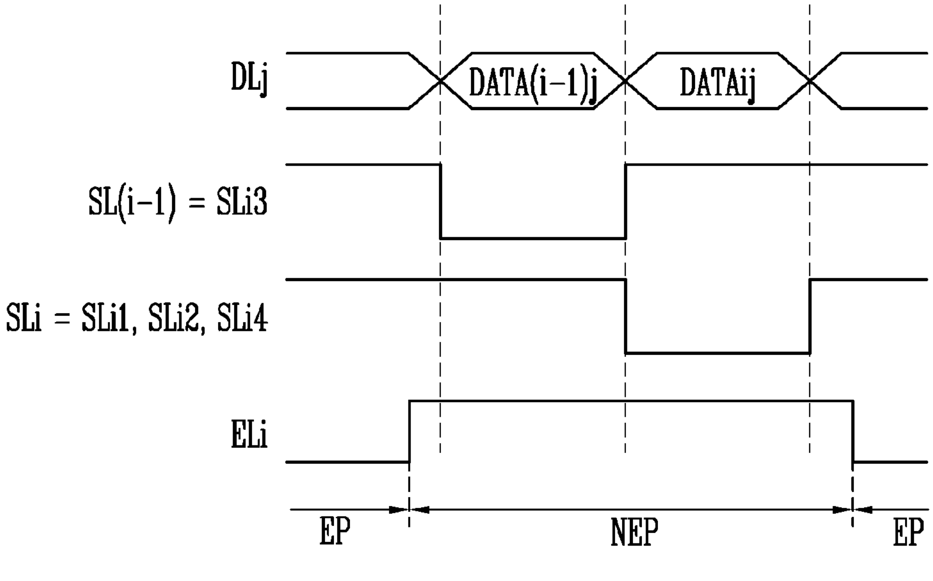
FIG. 3 illustrates an embodiment of a driving method of the sub-pixel of FIG. 2.

FIG. 3 illustrates an embodiment of a driving method of the sub-pixel of FIG. 2.

Hereinafter, for better understanding and ease of description, it is assumed that the scan lines SLi1, SLi2, and SLi4 are i-th scan lines SLi, and the scan line SLi3 is an (i−1)-th scan line SL(i−1). However, the scan lines SLi1, SLi2, SLi3, and SLi4 may have various connection relationships. In an embodiment, the scan line SLi4 may be the (i−1)-th scan line or the (i+1)-th scan line, for example.

First, a light emission signal having a turn-off level (logic high level, logic high level) is applied to the i-th light emission line ELi, a data voltage DATA(i−1)j for an (i−1)-th pixel is applied to the data line DLj, and a scan signal having a turn-on level (logic low level) is applied to the scan line SLi3. The logic high or low level may vary depending on whether the transistor is a P-type or N-type transistor.

In this case, since the scan signal having a turn-off level is applied to the scan lines SLi1 and SLi2, the second transistor T2 is in a turn-off state, and the data voltage DATA(i−1)j for the (i−1)-th sub-pixel is prevented from being inputted to the sub-pixel SPij.

In this case, since the fourth transistor T4 is in a turned-on state, the first node N1 is connected to the initialization line INTL, so that a voltage of the first node N1 is initialized. Since the light emission signal having a turn-off level is applied to the light emission line ELi, the transistors T5 and T6 are in a turn-off state, and unnecessary light-emitting of the light-emitting element LD according to the initialization voltage application process is prevented.

Next, the data voltage DATAij for the i-th sub-pixel SPij is applied to the data line DLj, and the scan signal having a turn-on level is applied to the scan lines SLi1 and SLi2. Accordingly, the transistors T2, T1, and T3 are turned on, and thus the data line DLj and the first node N1 are electrically connected. Accordingly, a compensation voltage obtained by subtracting a threshold voltage of the first transistor T1 from the data voltage DATAij is applied to the second electrode (that is, the first node N1) of the storage capacitor Cst, and the storage capacitor Cst maintains a voltage corresponding to a difference between the first power voltage and the compensation voltage. This period may be also referred to as a threshold voltage compensation period or data writing period.

In addition, when the scan line SLi4 is the i-th scan line, the seventh transistor T7 is turned on, so the anode of the light-emitting element LD and the initialization line INTL are connected, and the light-emitting element LD is initialized with an amount of charge corresponding to a voltage difference between the initialization voltage and the second power voltage.

Thereafter, as the light emission signal having a turn-on level is applied to the i-th light emission line ELi, the transistors T5 and T6 may be turned on. Accordingly, a driving current path connecting the first power line ELVDDL, the fifth transistor T5, the first transistor T1, the sixth transistor T6, the light-emitting element LD, and the second power line ELVSSL is formed.

An amount of driving current flowing through the first and second electrodes of the first transistor T1 is adjusted according to a voltage maintained in the storage capacitor Cst. The light-emitting element LD emits light with a luminance corresponding to the amount of driving current. The light-emitting element LD emits light until a light emission signal of a turn-off level is applied to the light emission line ELi.

When the light emission signal has a turned-on level, sub-pixels receiving the corresponding light emission signal may be in a display state. Accordingly, a period in which the light emission signal has the turned-on level may be also referred to as a light-emitting period EP (or a light-emitting permissive period). In addition, when the light emission signal has a turned-off level, sub-pixels receiving the corresponding light emission signal may be in a non-display state. Accordingly, a period in which the light emission signal has the turned-off level may be also referred to as a non-light-emitting period NEP (or a light emitting non-permissive period).

The non-light-emitting period NEP described in FIG. 3 is to prevent the sub-pixel SPij from emitting light with undesired luminance during the initialization period and the data writing period.

While data written in the sub-pixel SPij is maintained (e.g., one frame period), one or more non-light-emitting periods NEP may be additionally provided. This may be to effectively express a relatively low gray level by reducing the light-emitting period EP of the sub-pixel SPij, or to smoothly blur the motion of an image.

Figure 4:
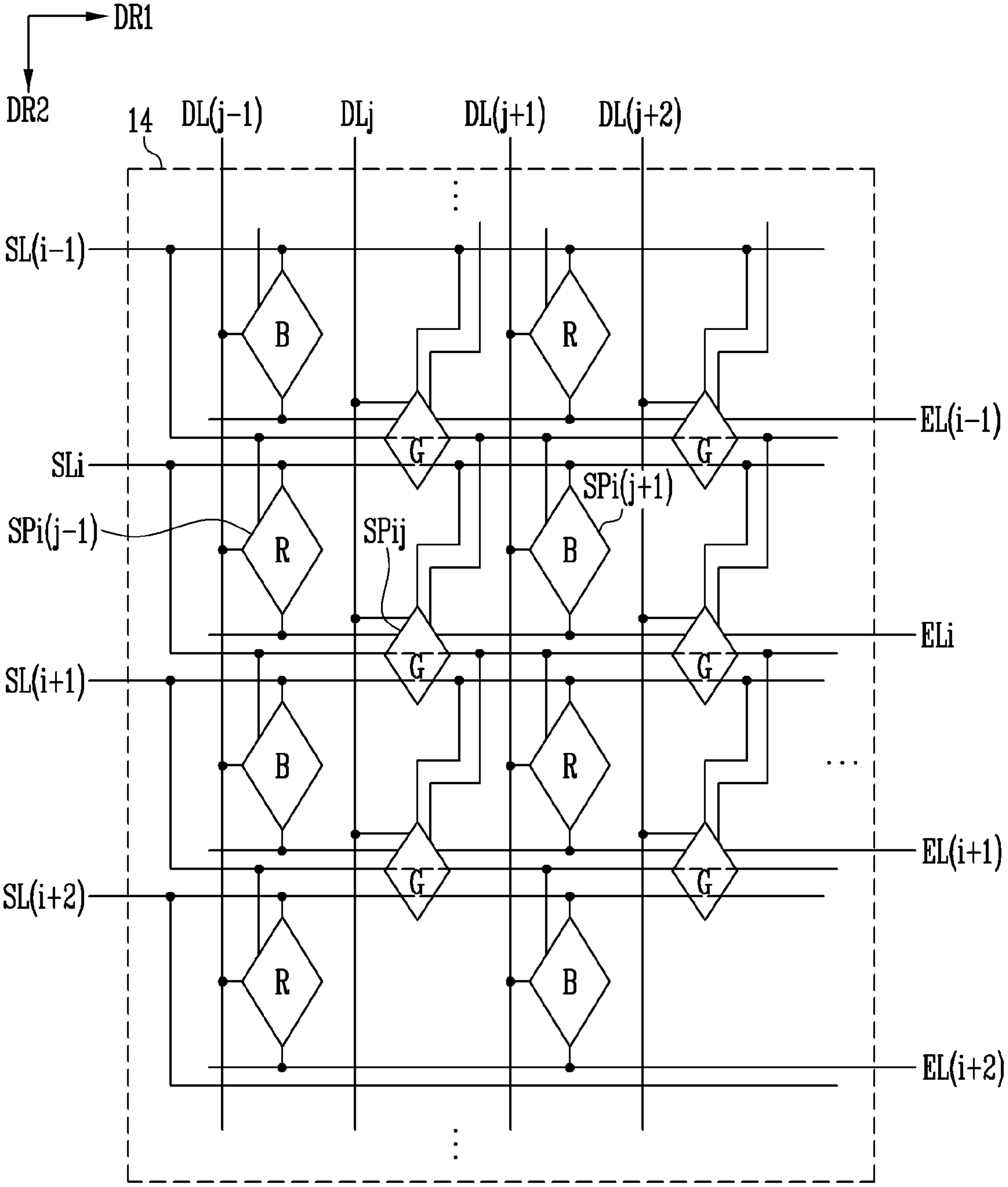
FIG. 4 illustrates a drawing for explaining an electrical connection relationship of sub-pixels.

FIG. 4 illustrates a drawing for explaining an electrical connection relationship of sub-pixels.

Referring to FIG. 4, a portion of the pixel part 14 is shown enlarged. Each of sub-pixels ( . . . , SPi(j−1), SPij, SPi(j+1), . . . ) may correspond to one of a first color R, a second color G, and a third color B.

In FIG. 4, positions of the sub-pixels ( . . . , SPi(j−1), SPij, SPi(j+1), . . . ) are shown based on each of light-emitting surfaces (a light-emitting material of a light-emitting diode). Accordingly, a position of a pixel circuit of the sub-pixels ( . . . , SPi(j−1), SPij, SPi(j+1), . . . ) may be different from that shown in FIG. 4. That is, the positions of the sub-pixels described in FIG. 4 and the drawings below describe the positions of the light-emitting surfaces of the sub-pixels.

In an embodiment, when a scan signal of a turn-on level is applied to the i-th scan line SLi, the sub-pixel SPi(j−1) may store the data voltage applied to the (j−1)-th data line DL(j−1), the sub-pixel SPij may store the data voltage applied to the j-th data line DLj, and the sub-pixel SPi(j+1) may store the data voltage applied to the (j+1)-th data line DL(j+1), for example.

The sub-pixels to which the scan transistor is connected to the ith scan line SLi may be repeatedly disposed in the order of the sub-pixel SPi(j−1) of the first color R, the sub-pixel SPij of the second color G, the sub-pixel SPi(j+1) of the third color B, and the sub-pixel of the second color G along a first direction DR1.

The sub-pixels in which the scan transistor is connected to the (i+1)-th scan line SL(i+1) closest to the i-th scan line SLi in a second direction DR2 may be repeatedly disposed in the order of the sub-pixel of the third color B, the sub-pixel of the second color G, the sub-pixel of the first color R, and the sub-pixel of the second color G along the first direction DR1. The first direction DR1 and the second direction DR2 may be different directions. In an embodiment, the first direction DR1 and the second direction DR2 may be perpendicular to each other, for example.

In FIG. 4 and the following drawings, although the shapes of the light-emitting surfaces of the sub-pixels ( . . . , SPi(j−1), SPij, SPi(j+1), . . . ) are shown in the form of a rhombical shape, the light-emitting surfaces of the sub-pixels ( . . . , SPi(j−1), SPij, SPi(j+1), . . . ) may have various shapes such as a circular shape, an elliptical shape, and a hexagonal shape. In addition, in FIG. 4 and the following drawings, although the embodiment in which the light-emitting areas of the sub-pixels of the first and third colors R and B are relatively large and the light-emitting areas of the sub-pixels of the second color G are relatively small is shown, in another embodiment, the light-emitting areas of the sub-pixels may vary according to the efficiency of the light-emitting material.

The structure of the pixel part 14 as shown in FIG. 4 is also referred to as a PENTILE™ structure or a diamond PENTILE™ structure.

Figure 5:
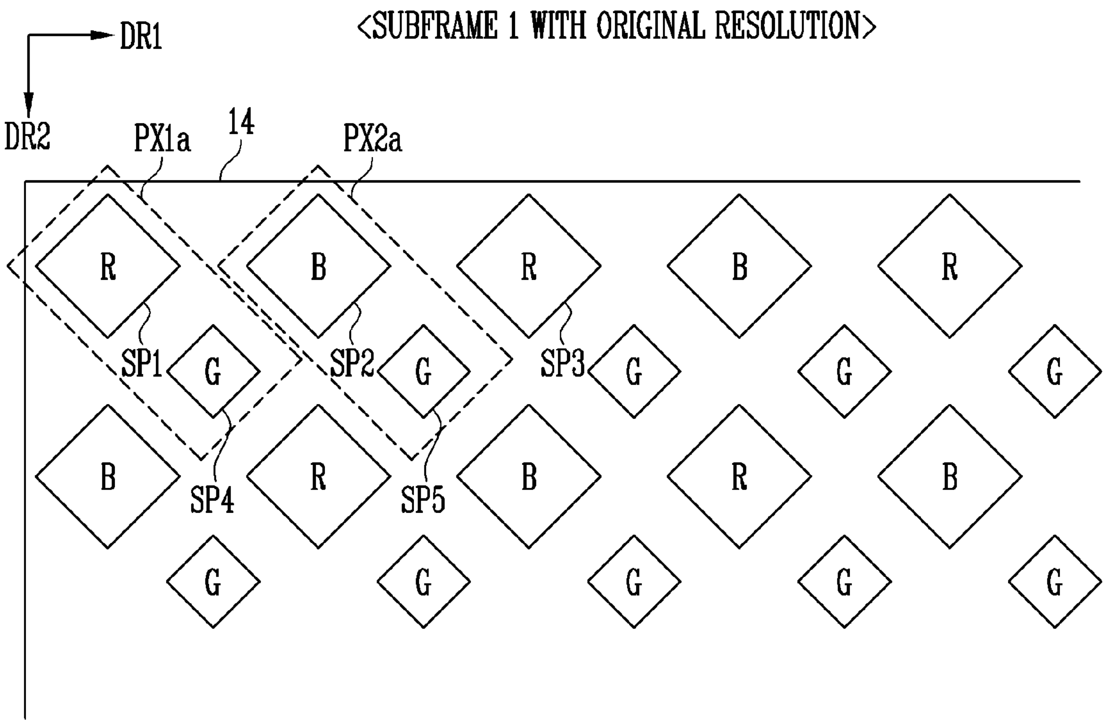
FIG. 5 to FIG. 6 illustrate drawings for explaining an embodiment of first and second sub-frames according to the invention.
Figure 6:
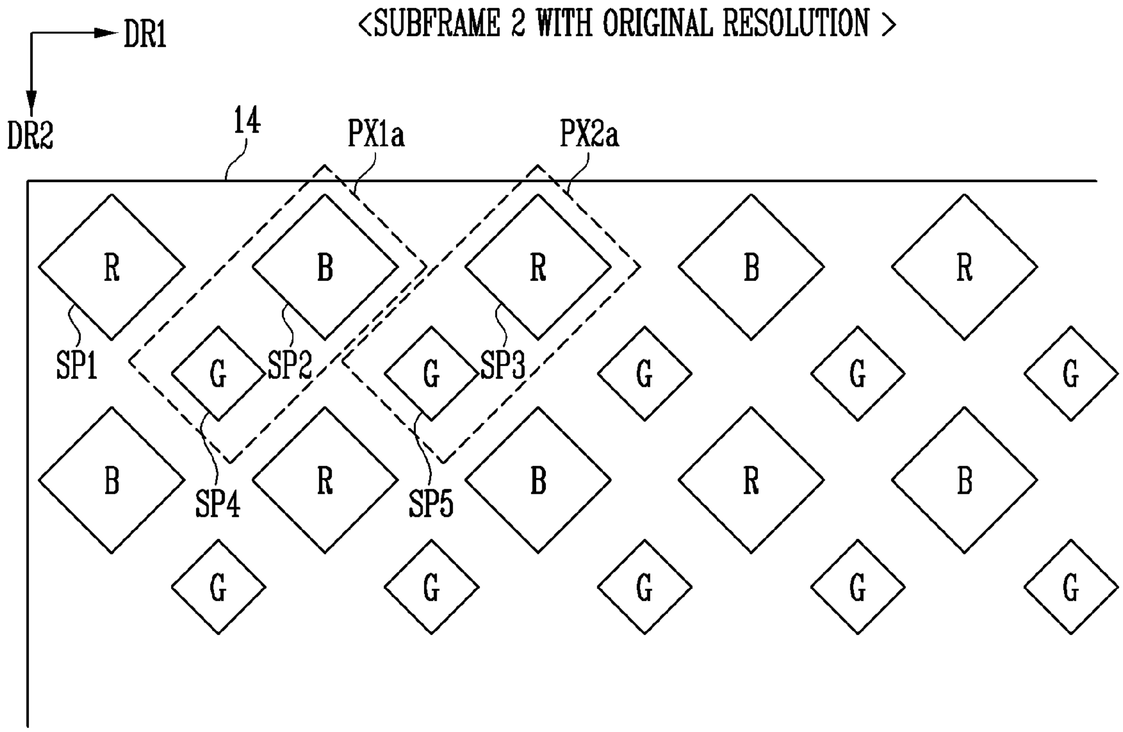

FIG. 5 to FIG. 6 illustrate drawings for explaining an embodiment of first and second sub-frames according to the invention.

In the embodiment of FIG. 5 and FIG. 6, the sub-frame generator 16 (refer to FIG. 1) may generate the first sub-frame and the second sub-frame based on the image frame. The pixel part 14 may sequentially display the first image (FIG. 5) corresponding to the first sub-frame and the second image (FIG. 6) corresponding to the second sub-frame.

The pixel part 14 may include a first sub-pixel SP1 of the first color R, a second sub-pixel SP2 of the third color B, and a third sub-pixel SP3 of the first color R sequentially arranged in the first direction DR1. In addition, the pixel part 14 may further include a fourth sub-pixel SP4 of the second color G that is closest to the first sub-pixel SP1 and the second sub-pixel SP2 in the second direction DR2 therebetween. In addition, the pixel part 14 may further include a fifth sub-pixel SP5 of the second color G that is closest to the second sub-pixel SP2 and the third sub-pixel SP3 in the second direction DR2 therebetween.

Referring to FIG. 5, the first sub-frame includes the first color grayscale and the second color grayscale for a first pixel PX1a, but may not include the third color grayscale. In the first sub-frame, the first sub-pixel SP1 may display the first color grayscale of the first pixel PX1a, and the fourth sub-pixel SP4 may display the second color grayscale of the first pixel PX1a.

The first sub-frame includes the second color grayscale and the third color grayscale for a second pixel PX2a that is closest to the first pixel PX1a in the first direction DR1, but may not include the first color grayscale. In the first sub-frame, the second sub-pixel SP2 may display the third color grayscale of the second pixel PX2a, and the fifth sub-pixel SP5 may display the second color grayscale of the second pixel PX2a.

Referring to FIG. 6, the second sub-frame includes the second color grayscale and the third color grayscale for the first pixel PX1a, but may not include the first color grayscale. In the second sub-frame, the second sub-pixel SP2 may display the third color grayscale of the first pixel PX1a, and the fourth sub-pixel SP4 may display the second color grayscale of the first pixel PX1a.

The second sub-frame includes the first color grayscale and the second color grayscale for the second pixel PX2a, but may not include the third color grayscale. In the second sub-frame, the third sub-pixel SP3 may display the first color grayscale of the second pixel PX2a, and the fifth sub-pixel SP5 may display the second color grayscale of the second pixel PX2a.

The first color grayscale for the first pixel PX1a in the first sub-frame may be the same as the first color grayscale for the first pixel PX1a in the image frame. The second color grayscale for the first pixel PX1a in the first sub-frame may be smaller than the second color grayscale for the first pixel PX1a in the image frame. In an embodiment, the second color grayscale for the first pixel PX1a in the first sub-frame may correspond to a half of the second color grayscale for the first pixel PX1a in the image frame, for example.

The third color grayscale for the first pixel PX1a in the second sub-frame may be the same as the third color grayscale for the first pixel PX1a in the image frame. The second color grayscale for the first pixel PX1a in the second sub-frame may be smaller than the second color grayscale for the first pixel PX1a in the image frame. In an embodiment, the second color grayscale for the first pixel PX1a in the second sub-frame may correspond to a half of the second color grayscale for the first pixel PX1a in the image frame, for example. In an embodiment, the second color grayscale for the first pixel PX1a in the second sub-frame may be the same as the second color grayscale for the first pixel PX1a in the first sub-frame, for example.

In an embodiment, it is assumed that the first color grayscale for the first pixel PX1a in the image frame is provided as 244, the second color grayscale therefor is provided as 128, and the third color grayscale therefor is provided as 70, for example. In this case, in the first sub-frame, the first sub-pixel SP1 may emit light of the first color R corresponding to 244, and the fourth sub-pixel SP4 may emit light of the second color G corresponding to 64. In the second sub-frame, the second sub-pixel SP2 may emit light of the third color B corresponding to 70, and the fourth sub-pixel SP4 may emit light of the second color G corresponding to 64. Accordingly, in displaying the first pixel PX1a, since there is no need to render with data of other adjacent pixels, even when the pixel part 14 includes a smaller number of sub-pixels than the number of color grayscales of the inputted image frame, deterioration of image quality may be prevented. In addition, the image may be displayed with the same resolution as the original resolution of the image frame. This description is equally applicable to other pixels including the second pixel PX2a of the image frame, so redundant descriptions are omitted.

FIG. 7 to FIG. 10 illustrate drawings for explaining another embodiment of first to fourth sub-frames according to the disclosure.

In the embodiment of FIG. 7 to FIG. 10, the sub-frame generator 16 may generate the first sub-frame and the second sub-frame based on the image frame. In addition, the sub-frame generator 16 may further generate the third sub-frame and the fourth sub-frame based on the image frame. The pixel part 14 may sequentially display the first image (FIG. 7) corresponding to the first sub-frame and the second image (FIG. 8) corresponding to the second sub-frame. The pixel part 14 may sequentially further display the third image (FIG. 9) corresponding to the third sub-frame and the fourth image (FIG. 10) corresponding to the fourth sub-frame after the second image.

The pixel part 14 may include the first sub-pixel SP1 of the first color R, the second sub-pixel SP2 of the third color B, and the third sub-pixel SP3 of the first color R sequentially arranged in the first direction DR1. In addition, the pixel part 14 may further include the fourth sub-pixel SP4 of the second color G that is closest to the first sub-pixel SP1 and the second sub-pixel SP2 in the second direction DR2 therebetween. In addition, the pixel part 14 may further include the fifth sub-pixel SP5 of the second color G that is closest to the second sub-pixel SP2 and the third sub-pixel SP3 in the second direction DR2 therebetween.

The pixel part 14 may further include a sixth sub-pixel SP6 of the third color B, a seventh sub-pixel SP7 of the first color R, and an eighth sub-pixel SP8 of the third color B sequentially arranged in the first direction DR1. The sixth sub-pixel SP6 may be disposed in the second direction DR2 from the first sub-pixel SP1. The seventh sub-pixel SP7 may be disposed in the second direction DR2 from the second sub-pixel SP2. The eighth sub-pixel SP8 may be disposed in the second direction DR2 from the third sub-pixel SP3.

Figure 7:
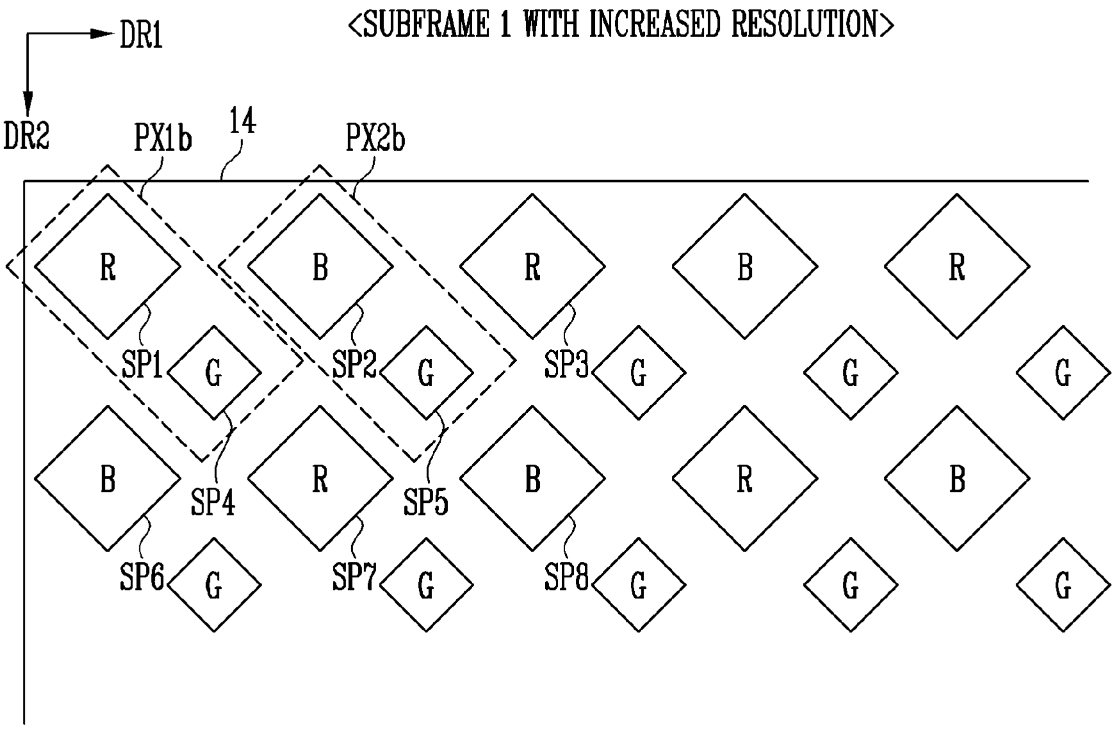
FIG. 7 to FIG. 10 illustrate drawings for explaining another embodiment of first to fourth sub-frames according to the disclosure.

Referring to FIG. 7, the first sub-frame includes the first color grayscale and the second color grayscale for a first pixel PX1b, but may not include the third color grayscale. In the first sub-frame, the first sub-pixel SP1 may display the first color grayscale of the first pixel PX1b, and the fourth sub-pixel SP4 may display the second color grayscale of the first pixel PX1b.

The first sub-frame includes the second color grayscale and the third color grayscale for a second pixel PX2b that is closest to the first pixel PX1b in the first direction DR1, but may not include the first color grayscale. In the first sub-frame, the second sub-pixel SP2 may display the third color grayscale of the second pixel PX2b, and the fifth sub-pixel SP5 may display the second color grayscale of the second pixel PX2b.

Figure 8:
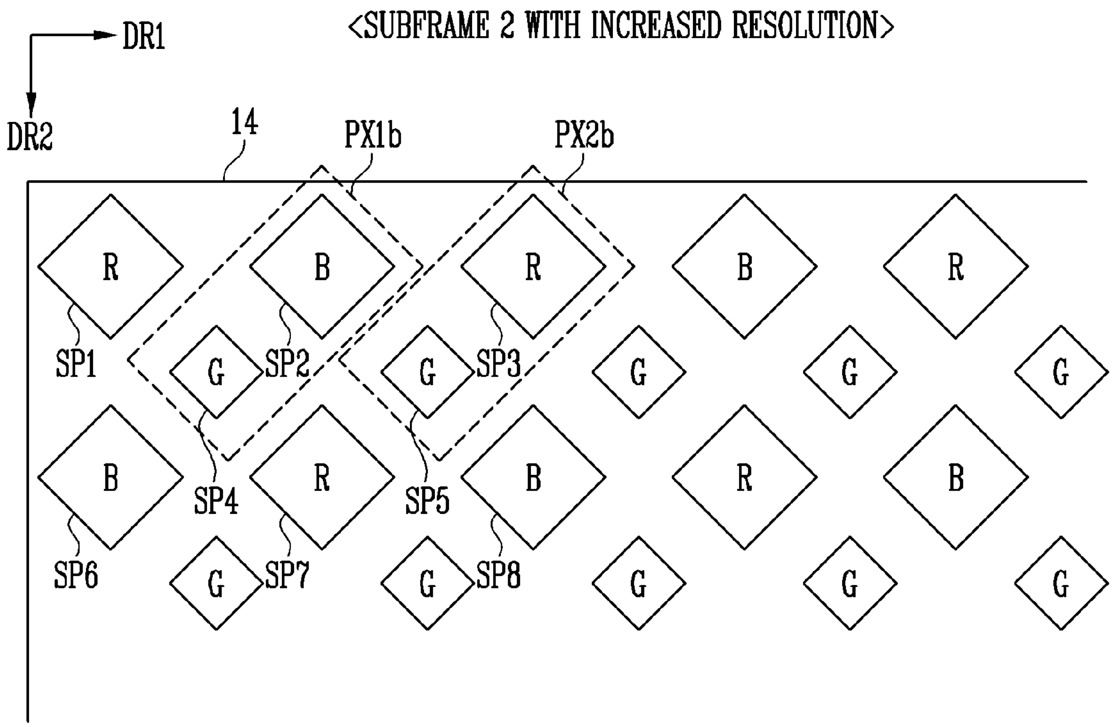

Referring to FIG. 8, the second sub-frame includes the second color grayscale and the third color grayscale for the first pixel PX1b, but may not include the first color grayscale. In the second sub-frame, the second sub-pixel SP2 may display the third color grayscale of the first pixel PX1b, and the fourth sub-pixel SP4 may display the second color grayscale of the first pixel PX1b.

The second sub-frame includes the first color grayscale and the second color grayscale for the second pixel PX2b, but may not include the third color grayscale. In the second sub-frame, the third sub-pixel SP3 may display the first color grayscale of the second pixel PX2b, and the fifth sub-pixel SP5 may display the second color grayscale of the second pixel PX2b.

Figure 9:
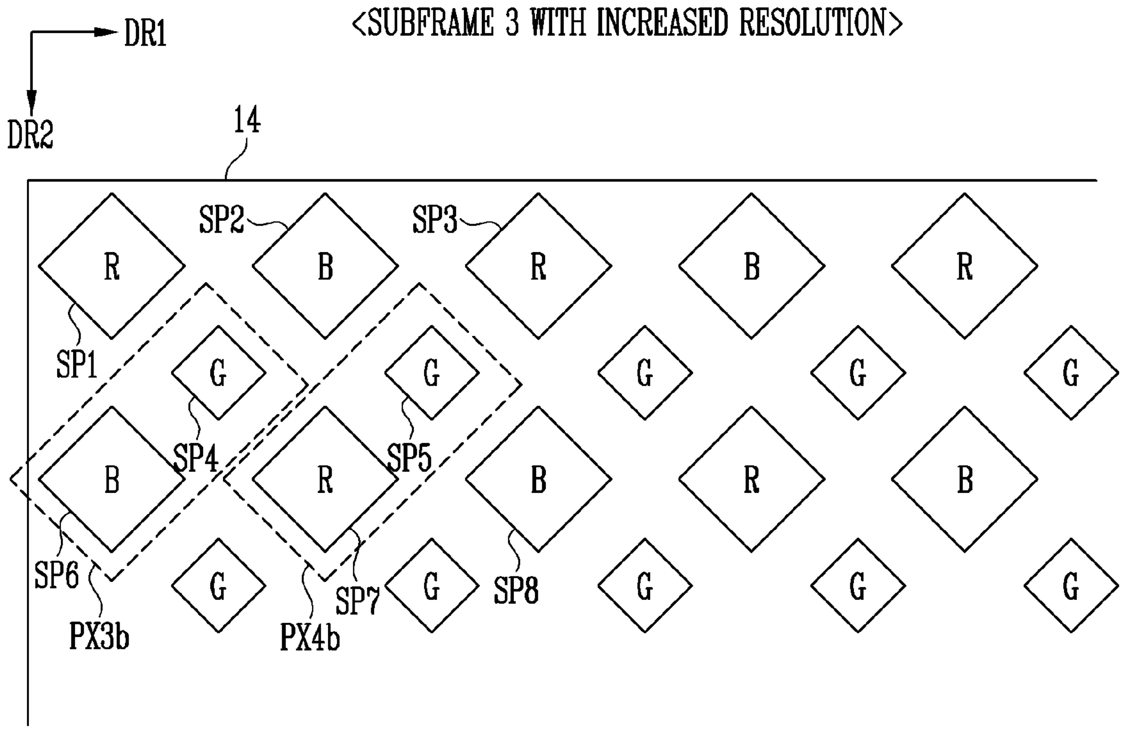

Referring to FIG. 9, the third sub-frame includes the second color grayscale and the third color grayscale for the third pixel PX3b, but may not include the first color grayscale. In the third sub-frame, the fourth sub-pixel SP4 may display the second color grayscale of the third pixel PX3b, and the sixth sub-pixel SP6 may display the third color grayscale of the third pixel PX3b.

The third sub-frame includes the first color grayscale and the second color grayscale for a fourth pixel PX4b that is closest to a third pixel PX3b in the first direction DR1, but may not include the third color grayscale. In the third sub-frame, the fifth sub-pixel SP5 may display the second color grayscale of the fourth pixel PX4b, and the seventh sub-pixel SP7 may display the first color grayscale of the fourth pixel PX4b.

Figure 10:
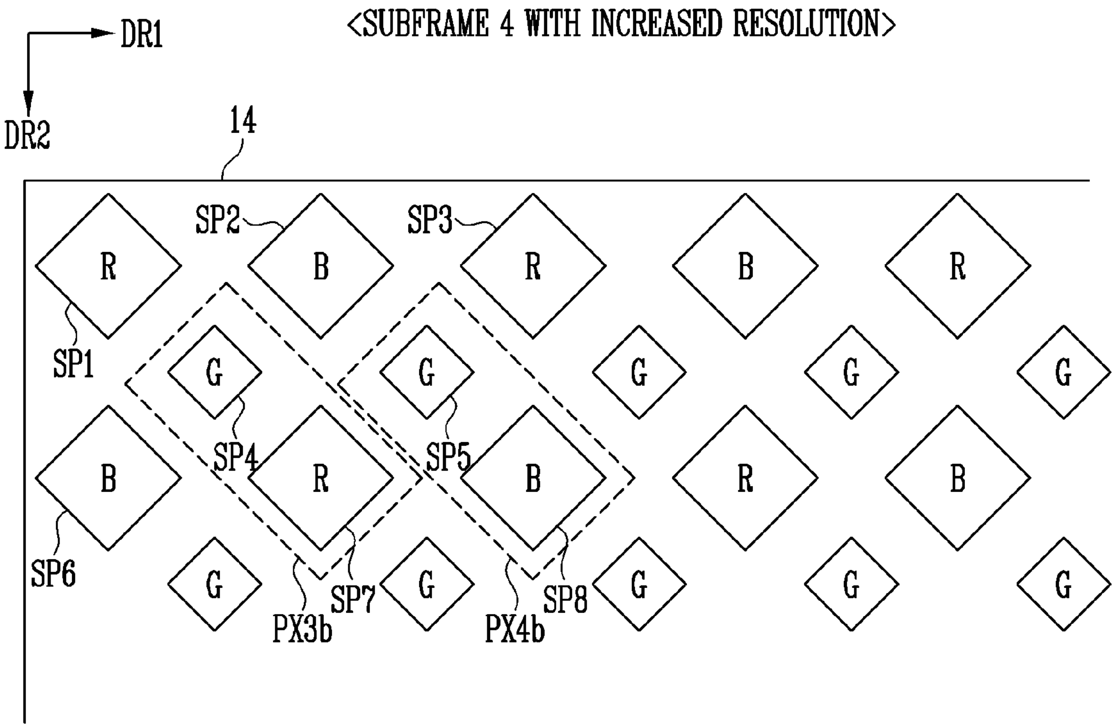

Referring to FIG. 10, the fourth sub-frame includes the first color grayscale and the second color grayscale for the third pixel PX3b, but may not include the third color grayscale. In the fourth sub-frame, the fourth sub-pixel SP4 may display the second color grayscale of the third pixel PX3b, and the seventh sub-pixel SP7 may display the first color grayscale of the third pixel PX3b.

The fourth sub-frame includes the second color grayscale and the third color grayscale for the fourth pixel PX4b, but may not include the first color grayscale. In the fourth sub-frame, the fifth sub-pixel SP5 may display the second color grayscale of the fourth pixel PX4b, and the eighth sub-pixel SP8 may display the third color grayscale of the fourth pixel PX4b.

In the illustrated embodiment, since there is no need to render with data of other adjacent pixels, even when the number of the sub-pixels is smaller than the number of the color grayscales of the inputted image frame, deterioration of image quality may be prevented. In addition, even when the resolution of the image frame is doubled compared to the resolution of the pixel part 14, display is possible without deterioration of image quality.

Figure 11:
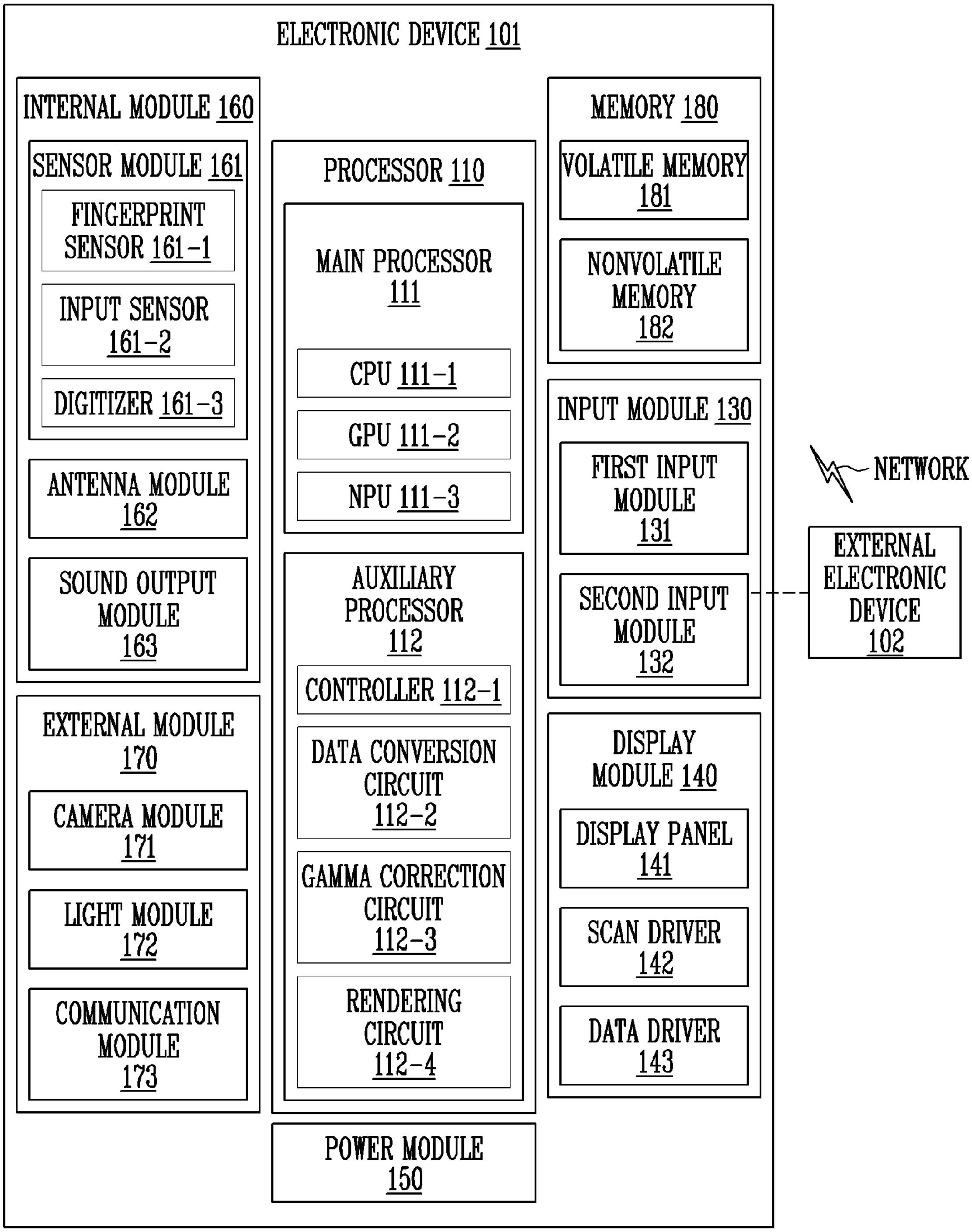
FIG. 11 illustrates a block diagram of an embodiment of an electronic device according to the invention.

FIG. 11 illustrates a block diagram of an embodiment of an electronic device 101 according to the invention.

The sub-frame generator 16 described with reference to FIG. 1 to FIG. 10 may be included in at least one of various blocks included in the electronic device 101. In an embodiment, the sub-frame generator 16 may be implemented as a part of a processor 110, for example. In an embodiment, the sub-frame generator 16 may be implemented as a part of a rendering circuit 112-4, for example. The sub-frame generator 16 may be implemented as a part of a display module 140. In an embodiment, the sub-frame generator 16 may be implemented as a part of a data driver 143, for example.

The electronic device 101 outputs various information through the display module 140 within an operating system. When the processor 110 executes an application stored in a memory 180, the display module 140 provides application information to a user through a display panel 141.

The processor 110 obtains external input through an input module 130 or a sensor module 161 and executes an application corresponding to the external input. In an embodiment, when a user selects a camera icon displayed on the display panel 141, the processor 110 obtains user input through an input sensor 161-2 and activates a camera module 171, for example. The processor 110 transmits image data corresponding to a captured image obtained through the camera module 171 to the display module 140. The display module 140 may display an image corresponding to the captured image through the display panel 141.

In another embodiment, when personal information authentication is executed in the display module 140, a fingerprint sensor 161-1 obtains inputted fingerprint information as input data. The processor 110 compares the inputted data obtained through the fingerprint sensor 161-1 with authentication data stored in the memory 180, and executes an application according to the compared result. The display module 140 may display information executed according to application logic through the display panel 141.

In another embodiment, when a music streaming icon displayed on the display module 140 is selected, the processor 110 obtains user input through the input sensor 161-2 and activates a music streaming application stored in the memory 180. When a music execution instruction is inputted from the music streaming application, the processor 110 activates a sound output module 163 to provide sound information corresponding to the music execution instruction to the user.

In the above, the operation of the electronic device 101 has been briefly described. Hereinafter, a configuration of the electronic device 101 will be described in detail. Some of components of the electronic device 101 to be described later may be integrated and provided as one component, and one component thereof may be divided and provided as two or more components.

Referring to FIG. 11, the electronic device 101 may communicate with an external electronic device 102 through a network (e.g., a short range wireless communication network or a long range wireless communication network). In the embodiment, the electronic device 101 may include the processor 110, the memory 180, the input module 130, the display module 140, a power module 150, an internal module (also referred to as an embedded module) 160, and an external module 170. In the embodiment, in the electronic device 101, at least one of the aforementioned constituent elements may be omitted, or one or more other constituent elements may be added. In the embodiment, some (e.g., the sensor module 161, an antenna module 162, or a sound output module 163) of the aforementioned constituent elements may be integrated into another constituent element (e.g., the display module 140).

The processor 110 may execute software to control at least one other constituent element (e.g., a hardware or software constituent element) of the electronic device 101 connected to the processor 110, and may perform various data processing or calculations. In the embodiment, as at least some of the data processing or operation, the processor 110 may store an instruction or data received from other constituent element (e.g., the input module 130, the sensor module 161, or a communication module 173) in a volatile memory 181, may process the instructions or data stored in the volatile memory 181, and may store the result data in a non-volatile memory 182.

The processor 110 may include a main processor 111 and an auxiliary processor 112. The main processor 111 may include one or more of a central processing unit ("CPU") 111-1 and an application processor ("AP"). The main processor 111 may further include one or more of a graphic processing unit ("GPU") 111-2, a communication processor ("CP"), and an image signal processor ("ISP"). The main processor 111 may further include a neural processing unit ("NPU") 111-3. The NPU is a processor specialized in processing an artificial intelligence model, and the artificial intelligence model may be generated through machine learning. The artificial intelligence model may include a plurality of artificial neural layers. The artificial neural network may be one of a deep neural network ("DNN"), a convolutional neural network ("CNN"), a recurrent neural network ("RNN"), a restricted Boltzmann machine ("RBM"), a deep belief network ("DBN"), a bidirectional recurrent deep neural network ("BRDNN"), a deep Q-network, and a combination of two or more thereof, but is not limited to the above example. The artificial intelligence models may additionally or alternatively include a software structure in addition to the hardware structure thereof. At least two of the aforementioned processing units and processors may be implemented as an integrated component (e.g., a single chip), or each thereof may be implemented as an independent component (e.g., a plurality of chips).

The auxiliary processor 112 may include a controller 112-1.

The controller 112-1 may include an interface conversion circuit and a timing control circuit. The controller 112-1 receives an image signal from the main processor 111, and converts a data format of the image signal to meet an interface specification with the display module 140 to output image data. The controller 112-1 may output various control signals desired for driving the display module 140.

The auxiliary processor 112 may further include a data conversion circuit 112-2, a gamma correction circuit 112-3, a rendering circuit 112-4 or the like. The data conversion circuit 112-2 may receive image data from the controller 112-1, and it may compensate the image data to display the image with a desired luminance according to characteristics of the electronic device 101 or a user's setting, or convert the image data to reduce power consumption or compensate for an afterimage. The gamma correction circuit 112-3 may convert the image data or gamma reference voltage so that the image displayed on the electronic device 101 has a desired gamma characteristic. The rendering circuit 112-4 may receive image data from the controller 112-1 and render the image data in consideration of pixel disposition of the display panel 141 applied to the electronic device 101. At least one of the data conversion circuit 112-2, the gamma correction circuit 112-3 and the rendering circuit 112-4 may be incorporated into another constituent element (e.g., the main processor 111 or the controller 112-1). At least one of the data conversion circuit 112-2, the gamma correction circuit 112-3 and the rendering circuit 112-4 may be integrated into a data driver 143 to be described later.

The memory 180 may store various data used by at least one constituent element (e.g., the processor 110 or the sensor module 161) of the electronic device 101, and input data or output data for an instruction related thereto. The memory 180 may include at least one or more of the volatile memory 181 and the non-volatile memory 182.

The input module 130 may receive an instruction or data to be used for a constituent element (e.g., the processor 110, the sensor module 161, or the sound output module 163) of the electronic device 101 from the outside of the electronic device 101 (e.g., a user or the external electronic device 102).

The input module 130 may include a first input module 131 to which an instruction or data is inputted from a user and a second input module 132 to which an instruction or data is inputted from the external electronic device 102. The first input module 131 may include a microphone, a mouse, a keyboard, a key (e.g., a button), or a writing instrument such as a pen (e.g., a passive pen or active pen). The second input module 132 may support a designated protocol that may be connected to the external electronic device 102 by wire or wirelessly. In the embodiment, the second input module 132 may include a high definition multimedia interface ("HDMI"), a universal serial bus ("USB") interface, a secure Digital ("SD") card interface, or an audio interface. The second input module 132 may include a connector that may be physically connected to the external electronic device 102. In an embodiment, the connector may include an HDMI connector, a USB connector, an SD card connector, or an audio connector (e.g., a headphone connector).

The display module 140 visually provides information to the user. The display module 140 may include a display panel 141, a scan driver 142, and a data driver 143. The display module 140 may further include a window, a chassis, and a bracket to protect the display panel 141.

The display panel 141 may include a liquid crystal display panel, an organic light-emitting display panel, or an inorganic light-emitting display panel, and the type of display panel 141 is not particularly limited. The display panel 141 may be a rigid type, or a flexible type that may be rolled or folded. The display module 140 may further include a supporter, a bracket, or a heat dissipation member for supporting the display panel 141.

The scan driver 142 may be disposed (e.g., mounted) on the display panel 141 as a driving chip. In addition, the scan driver 142 may be integrated in the display panel 141. In an embodiment, the scan driver 142 includes an amorphous silicon TFT gate driver circuit ("ASG"), a low temperature polycrystalline silicon ("LTPS") TFT gate driver circuit, or an oxide semiconductor TFT gate driver circuit ("OSG") that is embedded in the display panel 141, for example. The scan driver 142 receives a control signal from the controller 112-1, and outputs scan signals to the display panel 141 in response to the control signal.

The display panel 141 may further include a light emission driver. The light emission driver outputs a light emission control signal to the display panel 141 in response to the control signal received from the controller 112-1.

The light emission driver may be formed separately from the scan driver 142, or may be integrated in the scan driver 142.

The data driver 143 receives a control signal from the controller 112-1 converts image data into an analog voltage (e.g., a data voltage) in response to the control signal, and then outputs data voltages to the display panel 141.

The data driver 143 may be incorporated into other constituent elements (e.g., the controller 112-1). The functions of the interface conversion circuit and the timing control circuit of the controller 112-1 described above may be integrated into the data driver 143.

The display module 140 may further include a light emission driver and a voltage generating circuit. The voltage generating circuit may output various voltages desired for driving the display panel 141.

The power module 150 supplies power to the constituent elements of the electronic device 101. The power module 150 may include a battery in which a power voltage is charged. The battery may include a non-rechargeable primary battery, or a rechargeable battery or fuel cell. The power module 150 may include a power management IC ("PMIC"). The PMIC supplies optimized power to each of the above-described modules and modules to be described later. The power module 150 may include a wireless power transmission/reception member electrically connected to a battery. The wireless power transmission/reception member may include a plurality of antenna radiators in a form of a coil.

The electronic device 101 may further include an internal module 160 and an external module 170. The internal module 160 may include the sensor module 161, the antenna module 162, and the sound output module 163. The external module 170 may include the camera module 171, a light module 172, and the communication module 173.

The sensor module 161 may sense input by a user's body or input by the pen among the first input module 131, and may generate an electrical signal or a data value corresponding to the input. The sensor module 161 may include at least one or more of the fingerprint sensor 161-1, the input sensor 161-2 and the digitizer 161-3.

The fingerprint sensor 161-1 may generate a data value corresponding to a user's fingerprint. The fingerprint sensor 161-1 may include either an optical type or a capacitive type fingerprint sensor.

The input sensor 161-2 may generate a data value corresponding to coordinate information of input by the user's body or input by the pen. The input sensor 161-2 generates an amount of change in capacitance by the input as a data value. The input sensor 161-2 may sense input by the passive pen, or may transmit/receive data with the active pen.

The input sensor 161-2 may measure a bio-signal such as blood pressure, water, or body fat. In an embodiment, when the user touches a part of the body to the sensor layer or the sensing panel and does not move for a predetermined period of time, based on a change in an electric field by the part of the body, the input sensor 161-2 may sense a bio-signal and output desired information to the display module 140, for example.

The digitizer 161-3 may generate a data value corresponding to coordinate information of a pen input. The digitizer 161-3 generates an electromagnetic change amount by the input as a data value. The digitizer 161-3 may sense input by the passive pen, or may transmit/receive data with the active pen.

At least one of the fingerprint sensor 161-1, the input sensor 161-2 and the digitizer 161-3 may be implemented as a sensor layer formed on the display panel 141 through a continuous process. The fingerprint sensor 161-1, the input sensor 161-2 and the digitizer 161-3 may be disposed at an upper side of the display panel 141, and one of the fingerprint sensor 161-1, the input sensor 161-2 and the digitizer 161-3 for example, the digitizer 161-3 may be disposed at a lower side of the display panel 141.

At least two or more of the fingerprint sensor 161-1, the input sensor 161-2 and the digitizer 161-3 may be formed to be integrated into one sensing panel through the same process. When integrated into one sensing panel, the sensing panel may be disposed between the display panel 141 and a window disposed at an upper side of the display panel 141. In the embodiment, the sensing panel may be disposed on the window, and the position of the sensing panel is not particularly limited.

At least one of the fingerprint sensor 161-1, the input sensor 161-2 and the digitizer 161-3 may be embedded in the display panel 141. That is, at least one of the fingerprint sensor 161-1, the input sensor 161-2 and the digitizer 161-3 may be simultaneously formed through the process of forming elements (e.g., a light-emitting element, a transistor, or the like) included in the display panel 141.

In addition, the sensor module 161 may generate an electrical signal or a data value corresponding to an internal state or an external state of the electronic device 101. The sensor module 161 may further include a gesture sensor, a gyro sensor, a barometric pressure sensor, a magnetic sensor, an acceleration sensor, a grip sensor, a proximity sensor, a color sensor, an infrared ("IR") sensor, a biometric sensor, a temperature sensor, a humidity sensor, or an illuminance sensor, for example.

The antenna module 162 may include one or more antennas for transmitting or receiving a signal or power to or from the outside. In the embodiment, the communication module 173 may transmit a signal to an external electronic device or receive a signal from an external electronic device through an antenna suitable for a communication method. An antenna pattern of the antenna module 162 may be integrated into one component (e.g., the display panel 141) of the display module 140 or the input sensor 161-2

The sound output module 163 may be a device for outputting a sound signal to the outside of the electronic device 101, and may include a speaker used for general purposes such as multimedia playback or recording playback, and a receiver used exclusively for receiving calls, for example. In the embodiment, the receiver may be formed integrally with or separately from the speaker. A sound output pattern of the sound output module 163 may be integrated into the display module 140.

The camera module 171 may capture still images and moving images. In the embodiment, the camera module 171 may include one or more lenses, image sensors, or image signal processors. The camera module 171 may further include an IR camera capable of measuring the presence or absence of the user, the position of the user, and the gaze of the user.

The light module 172 may provide light. The light module 172 may include a light-emitting diode or a xenon lamp. The light module 172 may operate in conjunction with the camera module 171 or may operate independently.

The communication module 173 may support establishment of a wired or wireless communication channel between the electronic device 101 and the external electronic device 102, and communication through the established communication channel. The communication module 173 may include one or both of a wireless communication module, such as a cellular communication module, a short range communication module, or a global navigation satellite system ("GNSS") communication module and a wired communication module such as a local area network ("LAN") communication module or a power line communication module. The communication module 173 may communicate with the external electronic device 102 through a short range communication network such as Bluetooth™, WiFi direct, or IR data association ("IrDA") or a long range communication network such as a cellular network, the Internet, or a computer network (e.g., LAN or a wide area network ("WAN")). The various types of the communication modules 173 described above may be implemented as a single chip or may be implemented as separate chips.

The input module 130, the sensor module 161, the camera module 171, or the like may be used to control an operation of the display module 140 in conjunction with the processor 110.

The processor 110 outputs an instruction or data to the display module 140, the sound output module 163, the camera module 171, or the light module 172 based on input data received from the input module 130. In an embodiment, the processor 110 may generate image data in response to input data applied through a mouse or an active pen to output the generate image data to the display module 140, or may generate instruction data in response to the input data to output it to the camera module 171 or light module 172, for example. When input data is not received from the input module 130 for a predetermined period of time, the processor 110 may reduce power consumed by the electronic device 101 by changing an operation mode of the electronic device 101 to a low power mode or a sleep mode.

The processor 110 outputs an instruction or data to the display module 140, the sound output module 163, the camera module 171, or the light module 172 based on sensing data received from the sensor module 161. In an embodiment, the processor 110 may compare authentication data applied by the fingerprint sensor 161-1 with authentication data stored in the memory 180 and then execute an application according to the compared result, for example. The processor 110 may execute an instruction based on sensed data sensed by the input sensor 161-2 or the digitizer 161-3 or may output corresponding image data to the display module 140. When the sensor module 161 includes a temperature sensor, the processor 110 may receive temperature data for a measured temperature from the sensor module 161, and may further perform luminance correction on image data based on the temperature data.

The processor 110 may receive measurement data about the presence of a user, a user's position, a user's gaze, or the like, from the camera module 171. The processor 110 may further perform luminance correction or the like on image data based on the measurement data. In an embodiment, the processor 110 that determines the presence of a user through an input from the camera module 171 may output image data whose luminance is corrected through the data conversion circuit 112-2 or the gamma correction circuit 112-3 to the display module 140, for example.

Some of the above constituent elements may be connected to each other through a communication method between peripheral devices, e.g., a bus, a general purpose input/output ("GPIO"), a serial peripheral interface ("SPI"), a mobile industry processor interface ("MIPI"), or an ultra path interconnect ("UPI") link to exchange a signal (e.g., an instruction or data) with each other. The processor 110 may communicate with the display module 140 through a mutually agreed interface. In an embodiment, the processor 110 may use one of the above-described communication methods, and is not limited to the above-described communication methods.

The electronic device 101 according to various embodiments disclosed in the specification may be devices of various types. The electronic device 101 may include at least one of a portable communication device (e.g., a smartphone), a computer device, a portable multimedia device, a portable medical device, a camera, a wearable device, or a home appliance, for example. The electronic device 101 in the embodiment of the specification is not limited to the above-described devices.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the invention are possible. Consequently, the true technical protective scope of the invention must be determined based on the technical spirit of the appended claims.

What is claimed is:

1. A display device comprising:

a processor which provides an image frame;

a sub-frame generator which generates a first sub-frame and a second sub-frame based on the image frame; and a pixel part which sequentially displays a first image corresponding to the first sub-frame and a second image corresponding to the second sub-frame, wherein the image frame includes a first color grayscale, a second color grayscale, and a third color grayscale for each pixel;

the first sub-frame includes the first color grayscale and a predetermined second color grayscale for a first pixel, and does not include the third color grayscale for the first pixel; and the second sub-frame includes a predetermined second color grayscale and the third color grayscale for the first pixel, and does not include the first color grayscale for the first pixel, wherein the first color grayscale for the first pixel in the first sub-frame is identical to the first color grayscale for the first pixel in the image frame.

2. The display device of claim 1, wherein the predetermined second color grayscale for the first pixel in the first sub-frame is smaller than the second color grayscale for the first pixel in the image frame.

3. The display device of claim 2, wherein the third color grayscale for the first pixel in the second sub-frame is identical to the third color grayscale for the first pixel in the image frame.

4. The display device of claim 3, wherein the predetermined second color grayscale for the first pixel in the second sub-frame is smaller than the second color grayscale for the first pixel in the image frame.

5. The display device of claim 4, wherein the predetermined second color grayscale for the first pixel in the second sub-frame is identical to the predetermined second color grayscale for the first pixel in the first sub-frame.

6. The display device of claim 1, wherein:

the first sub-frame includes the second color grayscale and the third color grayscale for a second pixel closest to the first pixel in a first direction, and does not include the first color grayscale for the second pixel; and the second sub-frame includes the first color grayscale and the second color grayscale for the second pixel, and does not include the third color grayscale for the second pixel.

7. The display device of claim 6, wherein:

the pixel part includes a first sub-pixel of a first color, a second sub-pixel of a third color, and a third sub-pixel of the first color which are sequentially arranged in the first direction;

the pixel part further includes a fourth sub-pixel of a second color closest to the first sub-pixel and the second sub-pixel in a second direction therebetween; and the pixel part further includes a fifth sub-pixel of the second color closest to the second sub-pixel and the third sub-pixel in the second direction therebetween.

8. The display device of claim 7, wherein in the first sub-frame, the first sub-pixel displays the first color grayscale of the first pixel, the fourth sub-pixel displays the second color grayscale of the first pixel, the second sub-pixel displays the third color grayscale of the second pixel, and the fifth sub-pixel displays the second color grayscale of the second pixel.

9. The display device of claim 8, wherein in the second sub-frame, the second sub-pixel displays the third color grayscale of the first pixel, the fourth sub-pixel displays the second color grayscale of the first pixel, the third sub-pixel displays the first color grayscale of the second pixel, and the fifth sub-pixel displays the second color grayscale of the second pixel.

10. The display device of claim 9, wherein:

the sub-frame generator further generates a third sub-frame and a fourth sub-frame based on the image frame;

the pixel part sequentially further displays a third image corresponding to the third sub-frame and a fourth image corresponding to the fourth sub-frame after the second image;

the third sub-frame includes the second color grayscale and the third color grayscale for a third pixel, and does not include the first color grayscale for the third pixel; and the fourth sub-frame includes the first color grayscale and the second color grayscale for the third pixel, and does not include the third color grayscale for the third pixel.

11. The display device of claim 10, wherein:

the third sub-frame includes the first color grayscale and the second color grayscale for a fourth pixel closest to the third pixel in the first direction, and does not include the third color grayscale for the fourth pixel; and the fourth sub-frame includes the second color grayscale and the third color grayscale for the fourth pixel, and does not include the first color grayscale for the fourth pixel.

12. The display device of claim 11, wherein:

the pixel part further includes a sixth sub-pixel of the third color, a seventh sub-pixel of the first color, and an eighth sub-pixel of the third color sequentially arranged in the first direction;

the sixth sub-pixel is disposed in the second direction from the first sub-pixel;

the seventh sub-pixel is disposed in the second direction from the second sub-pixel; and the eighth sub-pixel is disposed in the second direction from the third sub-pixel.

13. The display device of claim 12, wherein in the third sub-frame, the fourth sub-pixel displays the second color grayscale of the third pixel, the sixth sub-pixel displays the third color grayscale of the third pixel, the fifth sub-pixel displays the second color grayscale of the fourth pixel, and the seventh sub-pixel displays the first color grayscale of the fourth pixel.

14. The display device of claim 13, wherein in the fourth sub-frame, the fourth sub-pixel displays the second color grayscale of the third pixel, the seventh sub-pixel displays the first color grayscale of the third pixel, the fifth sub-pixel displays the second color grayscale of the fourth pixel, and the eighth sub-pixel displays the third color grayscale of the fourth pixel.

15. A driving method of a display device, comprising:

receiving an image frame;

generating a first sub-frame based on the image frame;

displaying, by a pixel part, a first image corresponding to the first sub-frame;

generating a second sub-frame based on the image frame; and displaying, by the pixel part, a second image corresponding to the second sub-frame, wherein the image frame includes a first color grayscale, a second color grayscale, and a third color grayscale for each pixel;

the first sub-frame includes the first color grayscale and a predetermined second color grayscale for a first pixel, and does not include the third color grayscale for the first pixel; and the second sub-frame includes a predetermined second color grayscale and the third color grayscale for the first pixel, and does not include the first color grayscale for the first pixel, wherein the first color grayscale for the first pixel in the first sub-frame is identical to the first color grayscale for the first pixel in the image frame.

16. The driving method of the display device of claim 15, wherein the predetermined second color grayscale for the first pixel in the first sub-frame is smaller than the second color grayscale for the first pixel in the image frame.

17. The driving method of the display device of claim 16, wherein the third color grayscale for the first pixel in the second sub-frame is identical to the third color grayscale for the first pixel in the image frame.

18. The driving method of the display device of claim 17, wherein the predetermined second color grayscale for the first pixel in the second sub-frame is smaller than the second color grayscale for the first pixel in the image frame.

* * * * *